United States Patent Office 3,053,870
Patented Sept. 11, 1962

3,053,870
STABILIZATION OF RESINS
John W. Lynn and Andrew T. Walter, Charleston, W. Va., assignors to Union Carbide Corporation, a corporation of New York
No Drawing. Filed May 1, 1958, Ser. No. 732,121
15 Claims. (Cl. 260—429.7)

This invention relates to organic tin salts of N,N-bis-cyanoalkyl carboxamic acids and to the art of stabilizing resins prepared from substituted olefin monomers, particularly resins that are to be used in the preparation of artificial fibers.

It is well known that vinyl halide-vinyl nitrile containing copolymers, e.g., copolymers of acrylonitrile, methacrylonitrile and/or vinylidene cyanide with one or more vinyl halides such as vinyl chloride, vinylidene chloride, and the like, are sensitive to heat and to ultraviolet light as manifested by discoloration. It has therefore become customary to incorporate in them small amounts of stabilizers for the purpose of retarding or inhibiting discoloration when the resins are subjected to high temperatures or exposed to ultraviolet light.

A considerable number of stabilizers designed to inhibit discoloration have been proposed. Prominent among these are organic tin salts such as dioctyltin maleate. Unfortunately, stabilizers of this type have relatively poor compatibility with the resin and low solubility in the resin spinning solution, particularly when it is an acetonitrile solution such as is used in the spinning of terpolymers of vinyl chloride, vinylidene chloride and acrylonitrile, or copolymers of these monomers. Many of them also aggravate blushing of undyed fibers when subjected to boiling water.

In accordance with the invention, it has been found that organic tin salts of N,N-bis-cyanoalkyl carboxamic acids are useful as stabilizers for vinyl halide-vinyl nitrile containing copolymers. They are not only highly effective as stabilizers but have the further advantages of increased solubility in the spinning solution or "dope" as well as greater compatibility with the resin. These stabilizers can readily be prepared by reaction of an organic tin oxide or hydroxide with an N,N-bis-cyanoalkyl carboxamic acid. The term "carboxamic acid," as used herein, refers to a carboxylic acid containing an amide group.

The compounds found to be most effective as stabilizers are the stannic carboxamates having the general formula (I) 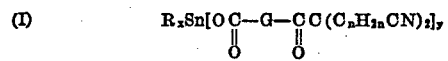

R is a hydrocarbon radical containing up to about eighteen carbon atoms, preferably alkyl, alkenyl, aryl or alkylaryl groups such as butyl, 2-ethylhexyl, lauryl, phenyl, and the like. G in Formula I is a divalent hydrocarbon group the dicarboxylic acid derivatives of which are susceptible to intramolecular dehydration to form the corresponding cyclic anhydrides, representative groups being ethylene, propylene, vinylene, phenylene and tetrahydrophenylene, as well as such groups substituted by fluoryl or alpha-(5,5-diethyl-1,3-dioxa-2-thio-3-phosphacyclohexylthio) group or the like. The groups specifically referred to by way of example occur in succinic, glutaric, maleic, phthalic, tetrahydrophthalic, fluoryl-substituted maleic and alpha-(5,5-diethyl-1,3-dioxa-2-thio-3-phosphacyclohexylthio)succinic acids, each of which is capable of forming anhydrides by intramolecular dehydration. $C_nH_{2n}$ is a divalent, linear or branched lower alkylene group such as methylene, ethylene, propylene and the like, n preferably being one, two or three. The sum of x and y is four, x being two when y is two and three when y is one. The R's need not necessarily be identical in each compound, tests having indicated that the critical group in the compounds of Formula I is the nitrile group.

The organic tin carboxamates of the invention are effective as stabilizers against heat or ultraviolet light when incorporated in the resin in low concentrations of the order of about 0.4 to 4% based on the weight of the resin. Concentrations of the order of about 2% by weight are preferred. Furthermore, the carboxamates are entirely compatible with the resins soluble in solvents, e.g., acetone, acetonitrile and dimethylformamide, that are most advantageously used in preparing spinning solutions for the resins. The presence of the carboxamates of the invention in clear or white spun fibers inhibits blushing when the fibers are washed in hot water and inhibits discoloration when they are otherwise subjected to high temperatures. When incorporated in dyed fibers they inhibit discoloration and retard loss of color and lustre otherwise experienced when the fibers are exposed to ultraviolet light. Their solubility in acetonitrile facilitates the spinning operation and avoids the necessity of working with a two-phase spinning solution.

The tin carboxamates of the invention can readily be prepared by bringing into contact and heating an organic stannic oxide or hydroxide of the formula (II)   $R_2SnO$ or $R_3SnOH$ in which each R in the above formula is as defined with reference to Formula I, and an N,N-bis-cyanoalkyl carboxamic acid of the general formula (III) 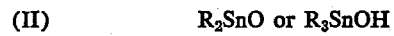
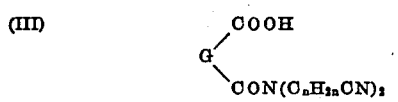

in which G and $C_nH_{2n}$ are as defined with reference to Formula I. This is preferably accomplished with the aid of a reflux medium that is inert towards the reactants and the products and therefore does not participate in or interfere with the reaction, e.g., benzene, methyl isobutyl ketone, toluene, xylene, heptane, cyclohexane, and the like. The reaction is carried out until complete, as indicated by a cessation in the formation of water as a by-product.

The method can be illustrated in the following equations showing, by way of example, the preparation of N,N-bis(2-cyanoethyl)maleamic acid from maleic anhydride and 3,3'-iminodipropionitrile.

(IV)
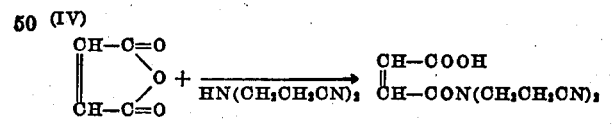

and the reaction of the resulting carboxamic (maleamic) acid with di-(2-ethylhexyl)tin oxide to form di-(2-ethylhexyl)tin di[N,N-bis(2-cyanoethyl)maleamate].

(V)
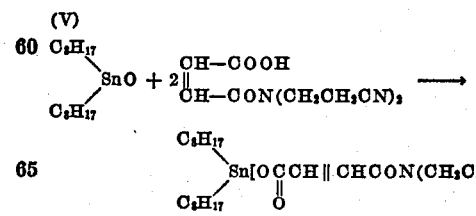

It is to be understood, of course, that the maleic acid anhydride in Reaction IV can be replaced by any other cyclic anhydride such as those referred to earlier, and that the 3,3'-iminodipropionitrile in that reaction can also be replaced, e.g., by iminodiacetonitrile, $HN(CH_2CN)_2$, or by branched acrylonitrile derivatives such as those from methacrylonitrile:

(VI)  $NH_3 + 2CH_2=C-CN \longrightarrow HN(CH_2CHCN)_2$
                    |                              |
                    $CH_3$                        $CH_3$ or from crotononitrile:

(VII)  $NH_3 + 2CH_3CH=CHCN \longrightarrow HN(CHCH_2CN)_2$
                                                  |
                                                  $CH_3$ In addition, it will be understood that in Equation V the octyl group of the tin oxide can be other alkyl groups or alkenyl, aryl or alkylaryl groups, that there will be three such groups when the initial tin compound is a hydroxide, and that in such case the molar proportions of initial tin compound to carboxamic acid will be 1:1 rather than 1:2.

The utility and advantages of the stabilizers of the invention as well as of resins stabilized therewith will become further apparent from the following examples included to illustrate the best modes of practicing the invention that are now contemplated.

EXAMPLE 1

*Preparation of Dibutyltin Di[N,N-Bis(2-Cyanoethyl)-Succinamate]*

30.3 grams (0.136 mol) of N,N-bis(2-cyanoethyl)-succinamic acid, 16.9 grams (0.068 mol) of dibutyltin oxide, and 300 cc. of methyl isobutyl ketone were charged to a glass kettle equipped with a stirrer and a decanting head. The mixture was refluxed for one hour during which time a clear solution formed and about one cc. of water was removed as a product of the reaction. The methyl isobutyl ketone diluent was then removed by vacuum stripping. The dibutyltin di[N,N-bis(2-cyanoethyl)succinamate] was obtained as an amber, viscous product which was soluble in acetone.

EXAMPLE 2

*Preparation of Di(2-Ethylhexyl)Tin Di[N,N-Bis-(2-Cyanoethyl)Succinamate]*

34.0 grams (0.153 mol) of N,N-bis(2-cyanoethyl)-succinamic acid, 29.1 grams (0.081 mol) of di(2-ethylhexyl)tin oxide, and 250 cc. of methyl isobutyl ketone were reacted in the apparatus and in a manner similar to Example 1. During a two-hour reflux period, about 1.6 cc. of water was removed. The final stripped di(2-ethylhexyl)tin di[N,N-bis(2-cyanoethyl)succinamate] was an orange-brown, viscous product which was soluble in acetone.

EXAMPLE 3

*Preparation of Dibutyltin Di[N,N-Bis(2-Cyanoethyl)-Fluorylsuccinamate]*

40.0 grams (0.103 mol) of N,N-bis(2-cyanoethyl)-fluorylsuccinamic acid prepared from 9-fluorylsuccinic anhydride and 3,3'-iminodipropionitrile, 12.8 grams (0.052 mol) of dibutyltin oxide, and 300 cc. of methyl isobutyl ketone were charged to an apparatus and reacted in the manner described in Example 1. During a one-hour reaction period about 2.8 cc. of water was removed. The final stripped dibutyltin di[N,N-bis(2-cyanoethyl)fluorylsuccinamate] was a caramel colored, viscous product.

EXAMPLE 4

*Preparation of Dibutyltin Di[N,N-Bis(2-Cyanoethyl)-Phthalamate]*

40.0 grams (0.148 mol) of N,N-bis(2-cyanoethyl)-phthalamic acid, 18.3 grams (0.074 mol) of dibutyltin oxide, and 300 cc. of methyl isobutyl ketone were charged to an apparatus and reacted in the manner described in Example 1. During the course of the reaction period, 3.4 cc. water was removed. The stripped dibutylin di[N,N-bis(2-cyanoethyl)phthalamate] was a white solid, which was soluble in acetone.

EXAMPLE 5

*Preparation of Dibutyltin Di[N,N-Bis(2-Cyanoethyl)-Tetrahydrophthalamate]*

40.0 grams (0.145 mol) of N,N-bis(2-cyanoethyl)-tetrahydrophthalamic acid, 18.0 grams (0.073 mol) of dibutyltin oxide, and 250 cc. of methyl isobutyl ketone were charged to an apparatus and reacted in the manner described in Example 1. During the course of the reaction period, 0.8 cc. of water was removed. The stripped dibutyltin di[N,N - bis(2 - cyanoethyl)tetrahydrophthalamate] was an amber, viscous product which was soluble in acetone.

EXAMPLE 6

*Preparation of Dilauryltin Di[N,N-Bis(2-cyanoethyl)-Maleamate]*

66.3 grams (0.30 mol) of N,N-bis(2-cyanoethyl)-maleamic acid, 71.0 grams (0.15 mol) of dilauryltin oxide, and 200 cc. of benzene were charged to an apparatus, and reacted in the manner described in Example 1. During a three-hour reflux period, 3 cc. of water was removed. The final stripped dilauryltin di[N,N-bis(2-cyanoethyl)maleamate] was a yellowish, thick viscous liquid, which was soluble in acetone, acetonitrile, and dimethylformamide.

EXAMPLE 7

*Preparation of Diphenyltin Di[N,N-Bis(2-Cyanoethyl) Maleamate]*

88.4 grams (0.4 mol) of N,N-bis(2-cyanoethyl)maleamic acid, 57.8 grams (0.2 mol) of diphenyltin oxide, and 300 cc. of benzene were charged to an apparatus, and reacted in the manner described in Example 1. The mixture was refluxed for 2.5 hours during which time 3.5 cc. of water was removed. The final stripped diphenyltin di-[N,N-bis(2-cyanoethyl)maleamate] was a white crystalline solid which melted at 163.5 to 165° C. The product was soluble in acetone, acetonitrile, and dimethylformamide.

EXAMPLE 8

*Preparation of Triphenyltin [N,N-bis(2-cyanoethyl)-maleamate]*

44.2 grams (0.2 mol) of N,N-bis(2-cyanoethyl)maleamic acid, 73.4 grams (0.2 mol) of triphenyltin hydroxide, and 300 cc. of benzene were charged to an apparatus, and reacted in the manner described in Example 1. During a two-hour refluxing period, 2 cc. of water was removed. After stripping off the benzene, the triphenyltin [N,N-bis(2-cyanoethyl)maleamate] was obtained as a light yellow, crystalline solid, which melted at 147 to 149° C. The product was soluble in acetone, acetonitrile, and dimethylformamide.

EXAMPLE 9

*Stabilization of Vinyl Chloride-Acrylonitrile Copolymer*

500 grams of a copolymer of vinyl chloride (60.1%) and acrylonitrile (39.9%) having a molecular weight such that the specific viscosity of an 0.2% solution of the resin in cyclohexanone at 20° C. was 0.247 and 10 grams (2% by weight) of stabilizer were added, while stirring, to 1500 grams of acetonitrile chilled to −10° C. to form a slurry. The slurry was heated to 50° C. with stirring to solvate the resin. The container was then closed and polymer dissolution was completed at 65° C. to form a clear amber solution suitable for spinning and containing 25% solids.

The solution was further homogenized by circulating it through a recycling system. A portion of the circulating "dope" was metered by a gear pump to a spinnerette having forty holes each 0.16 mm. in diameter. Filaments were extruded at the rate of 71 ft./min. into a coagulating bath consisting of water and acetone in a ratio of 85:15 at 50° C. After about five seconds residence in the coagulating bath, the fibers passed to a second bath consisting of water at 85° C. The fibers were withdrawn from the second bath at the rate of 100 ft./min., representing a 1.4/1 drawing ratio, onto a thread advancing godet mounted in a circulating air oven maintained at 90° C. After twenty laps on the godet, the yarn passed to a metal take-up bobbin also enclosed in the air oven.

After twenty-four to thirty-six hours aging at room temperature, the dry yarns were stretched 1000% continuously in a steam chamber at 15 p.s.i. The stretched yarns were annealed by allowing free shrinkage while heating to 110° C. at the rate of ½° C./min. increase and at 110° C. for six hours.

Five yarns were prepared in the manner described using, in each instance, 2% by weight of one of the stabilizers described in Examples 1 to 5. Two other yarns were prepared in the same manner, one of them for control with no stabilizer and the other with 2% by weight of glycidyl ether of Bis-Phenol A (A–5), a known stabilizer.

The undyed yarns were tested for tenacity, elongation, shrinkage and blue light reflectance, the blue light reflectance of the undyed yarns being measured before and after eighty hours' exposure in an Atlas Fadeometer by a Photovolt reflectance meter. The results are tabulated in Table I.

TABLE I

| Stabilizer | None | A-5 | Example 1 | Example 2 | Example 3 | Example 4 | Example 5 |
|---|---|---|---|---|---|---|---|
| Denier | 308 | 240 | 240 | 250 | 236 | 243 | 248 |
| Tenacity (gms./denier) | 3.08 | 2.83 | 2.27 | 2.88 | 2.98 | 2.94 | 2.98 |
| Elongation, percent | 22.5 | 22.0 | 22.5 | 22.0 | 21.0 | 21.0 | 21.0 |
| Shrinkage, Percent in Boiling Water | 2.8 | 3.0 | 3.5 | 3.5 | 3.1 | 4.2 | 3.6 |
| Dye Absorption, Percent acetate | | 3.39 | 3.63 | 3.51 | 3.2 | 3.11 | 3.15 |
| Percent BLR before exposure | 35 | 42.0 | 36.5 | 35.0 | 36.0 | 35 | 35.5 |
| Percent BLR after exposure | 28.5 | 25 | 39.0 | 34.0 | 37.0 | 37.0 | 37.0 |

These data show that the yarns containing the organic tin cyanolkyl carboxamates of the invention had significantly better blue light reflectance after exposure than did either the control yarn or the yarn containing the commercially available diglycidyl ether.

EXAMPLE 10

*Stabilization of a Terpolymer of Acrylonitrile, Vinyl Chloride and Vinylidene Chloride*

100 grams of a terpolymer of acrylonitrile (70%), vinyl chloride (20%) and vinylidene chloride (10%) having an average molecular weight such that the specific viscosity of an 0.2% solution thereof in dimethylformamide at 20° C. was 0.345 and 2 grams (2%) of a stabilizer were added to 349 grams of acetonitrile while stirring to form a slurry. The slurry was heated with agitation to 50° C. to solvate the resin, the pot was sealed and the solvation completed by heating the solution to 70 to 80° C. The resulting solution containing 22% solids was suitable for spinning.

The solvated "dope" was metered by a gear pump to a spinnerette having 100 orifices each 0.10 mm. in diameter. Filaments were extruded at the rate of 26 ft./min. into a coagulating bath consisting of water and acetonitrile in the ratio of 85:15 at 65° C. After about 6.8 seconds residence time in the coagulating bath the fibers were withdrawn onto a godet having a peripheral speed of 30 ft./min. The fibers were washed with water at 80° C. as they passed in five laps along the thread advancing godet and then were passed to a second thread advancing godet where they were dried in an air oven at 65° C. and taken up continuously on a metal bobbin.

After sixteen to eighteen hours aging at 65° C., the yarns were stretched 1000% while passing continuously through a steam tube heated with steam at 36 p.s.i. The stretched yarns were annealed continuously by allowing about 12% shrinkage as they passed through a slot in a metal bar heated to about 200° C.

The stabilizers used in the preparation of four yarns in accordance with the procedure of this example were dibutyltin di[N,N-bis(2-cyanoethyl)succinamate] (Example 1), di(2-ethylhexyl)tin di[N,N-bis(2-cyanoethyl)-succinamate] (Example 2), dibutyltin di[N,N-bis(2-cyanoethyl)tetrahydrophthalamate] (Example 5), and di-(2-ethylhexyl)tin di[N,N-bis(2 - cyanoethylmaleamate], prepared as described in Example 6 but using di(2-ethylhexyl)tin oxide in place of dilauryltin oxide and identified in Table II as DTDM. Two other yarns were also prepared in the same manner, one of them for control with no stabilizer and the other with 2% by weight of the known stabilizer diglycidyl ether of Bis-Phenol A (A–5). The yarns were tested in the same manner as described in Example 9. The results are tabulated in Table II immediately below:

TABLE II

| Stabilizer | None | A-5 | Example 1 | Example 2 | Example 5 | DTDM |
|---|---|---|---|---|---|---|
| Denier | 235 | 224 | 216 | 212 | 218 | 215 |
| Tenacity (gms./denier) | 4.3 | 3.3 | 3.6 | 3.56 | 3.7 | 3.62 |
| Elongation, percent | 14.5 | 12.7 | 14.0 | 13.5 | 14.0 | 14.0 |
| Shrinkage, Percent in Boiling Water | 2.0 | 1.5 | 1.0 | 2.0 | 1.0 | 1.0 |
| Percent BLR before exposure | 57.5 | 60.0 | 57.0 | 60.0 | 58.0 | 63.0 |
| Percent BLR after exposure | 22.0 | 44.5 | 54.0 | 58.0 | 55.5 | 59.0 |

EXAMPLE 11

*Stabilization of a Terpolymer of Acrylonitrile, Vinyl Chloride and Vinylidene Chloride*

400 grams of a terpolymer of acrylonitrile (69%), vinyl chloride (20%) and vinylidene chloride (11%) having an average molecular weight such that the specific viscosity of an 0.2% solution in dimethylformamide at 20° C. was 0.303 and 8 grams (2% by weight) of a stabilizer were added, while stirring, to 1200 grams of acetonitrile to form a slurry. The slurry was then heated with agitation to 50° C. to solvate the resin. The vessel was sealed and solvation was completed by heating the solution to 70 to 80° C.

This solvated dope was metered by a gear pump to a spinnerette consisting of 100 holes each 0.100 mm. in diameter. Filaments were extruded at the rate of 42.5 ft./min. into a 60° C. coagulating bath consisting of water and acetonitrile in the ratio of 85:15 and 0.05% of Calgon as a rust inhibitor. After about 5.5 seconds contact time the fibers were withdrawn from the coagulating bath onto a godet having a peripheral speed of 42.5 ft./min. The yarn was washed on the godet with water at 82° C. which contained 0.5% of polyethylene glycol as a yarn lubricant. After five laps on the washing godet the yarn passed to an internally heated godet having a peripheral speed of 52 ft./min. and a surface temperature of about 113° C. After about 96 seconds contact time the yarn passed to a second internally heated godet having peripheral speed of 53.5 ft./min. and surface temperature of 164° C.

The yarn was stretched 500% on leaving the heated godet by drawing to another godet having a peripheral speed of 321 ft./min. The stretched yarn was annealed by allowing about 15% shrinkage to occur while it passed through slots in a metal block electrically heated to about 210° C.

Three samples of yarn were prepared in the same manner described each with a different stabilizer selected from those described in Examples 6, 7 and 8. One sample of yarn was prepared for control purposes without a stabilizer.

The yarns were tested in the same manner as described in Example 9. The results appear in Table III.

TABLE III

| Stabilizer | None | Example 6 | Example 7 | Example 8 |
|---|---|---|---|---|
| Tenacity (gms./denier) | 3.3 | 3.6 | 3.2 | 3.2 |
| Elongation, Percent | 20.4 | 17.3 | 19.0 | 17.5 |
| Shrinkage, Percent in Boiling Water | 4.0 | 2.0 | 2.0 | 3.0 |
| Percent BLR before exposure | 58.0 | 60.0 | 57.0 | 58.0 |
| Percent BLR after exposure | 35.2 | 50.0 | 57.5 | 56.5 |

These data show that the yarns stabilized in accordance with the method of the invention are characterized by good initial color and a high degree of resistance to discoloration during exposure in a Fadeometer at 145° F. for eighty hours or more.

EXAMPLE 12

*Stabilization of Vinylidene Chloride-Acrylonitrile Copolymer*

To a glass-lined autoclave of about five gallons capacity equipped with a stirrer rotating at 170 r.p.m. and jacketed for temperature control was added thirty-two pounds of deionized water, 0.35 gram (0.0007 lb.) of sodium bisulfite, 0.12 pound of Aerosol OT (wetting agent), 0.12 pound of mixed tertiary mercaptans, 2.4 pounds of washed vinylidene chloride and 5.6 pounds of acrylonitrile. The autoclave was then purged with nitrogen, sealed, pressurized to 14 p.s.i. with nitrogen and the temperature raised to 45° C. At this point, 0.02 pound of potassium persulfate was added and after 1.4 hours polymer appeared in the autoclave. The reaction was stopped after 2.8 hours and the autoclave product diluted with ten gallons of deionized water. To the diluted emulsion was added 0.05 pound of calcium chloride and the material was brought to 100° C. The coagulated slurry was centrifuged and the polymer washed with fifteen gallons of water. The recovered resin was dried to 99.5% solids after thirty-six hours in an air oven at 65° C. A gross yield of 48% (monomer to polymer) was realized in this run. Analysis of the polymer indicated that it consisted of 33.5% vinylidene chloride and 59.2% acrylonitrile with a material balance of 92.7% from chlorine and nitrogen analysis or 33.5% vinylidene chloride and 66.5% acrylonitrile by difference. Molecular weight of the product was such that the specific viscosity of an 0.2% solution in dimethylformamide at 20° C. was 0.382.

To a jacketed vessel equipped with a stirrer was added 1164 grams of acetonitrile chilled to 0° C., 400 grams of the resin described above, 8 grams of di-(2-ethylhexyl)-tin di[N,N-bis(2-cyanoethyl)maleamate] (DTDM) and 36 grams of dimethylformamide to form a slurry. The slurry was then heated while stirring to 80° C. to solvate the resin. The vessel was then sealed and the solution containing 25% resin filtered and then metered to a spinnerette consisting of 100 holes each 0.10 mm. in diameter. The extruded filaments were coagulated in a bath consisting of water and acetonitrile in the ratio of 90/10 at 60° C. and containing 0.05% Calgon as rust inhibitor. After about five seconds the filaments were withdrawn from the coagulating bath at 42.5 ft./min. onto a godet where they were washed continuously with water at 82° C. containing 0.5% of polyethylene glycol 4000 and 0.05% Calgon.

After eight laps on the wash roll the yarn passed to a drying godet consisting of a roll heated to about 110° C. and having a peripheral speed of 52 ft./min. After about ninety-six seconds the yarn passed to a second drying godet having a peripheral speed of 53.5 ft./min. and maximum temperature of 163° C. After about seventy-six seconds on the second drying godet the yarns were stretched as they passed to a fourth godet having a peripheral speed of 321 ft./min. and annealed as they passed continuously through a slot in a metal block heated to about 200° C. to a take-off roll having a peripheral speed of 267.5 ft./min. The annealed yarns were continuously collected by winding on a bobbin. These yarns had excellent textile properties and exhibited very good resistance to color change in an Atlas Fadeometer operating at 145° F.

In Table IV this yarn is compared with a sample of yarn prepared under the same conditions but containing no stabilizer. These data indicate that the change in color after eighty hours in the fadeometer was about 2.7 times as great for the control sample as for the stabilized yarn. This difference was quite apparent visually

TABLE IV

| Stabilizer | None | DTDM |
|---|---|---|
| Tenacity (gms./denier) | 3.4 | 3.2 |
| Elongation, Percent | 19.0 | 19.5 |
| Shrinkage, Percent in Boiling Water | 1.5 | 1.5 |
| Shrinkage, Percent in 150° C. Air | 2.0 | 2.0 |
| Shrinkage, Percent in 200° C. Air | 3.0 | 3.0 |
| Percent BLR before exposure | 53.0 | 53.7 |
| Percent BLR after exposure | 39.0 | 48.4 |
| Color loss after eighty hours, Percent | 26.5 | 9.9 |

EXAMPLE 13

Tributyltin N,N-bis(2-cyanoethyl)maleamate and di(2-ethylhexyl)tin di[alpha(5,5-diethyl-1,3-dioxa - 2 - thio-2-phosphacyclohexylthio) - N,N-bis(2-cyanoethyl)succinamate]

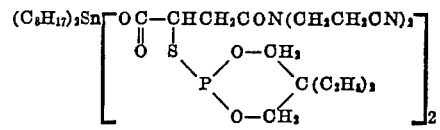

were prepared by heating tributyltin hydroxide with N,N-bis(2-cyanoethyl)maleamic acid and di(2-ethylhexyl)tin oxide with N,N-bis(2-cyanoethyl) - alpha - (5,5-diethyl-1,3-dioxa-2-thio - 3 - phosphacyclohexylthio)succinamic acid, respectively, under reflux as described in Example 8. The carboxamates thus prepared were readily soluble in acetone and acetonitrile.

2% by weight of each of these tin carboxamates were incorporated in a terpolymer of vinyl chloride, vinylidene chloride and acrylonitrile as described in Example 10. It was found that the glue light reflectance of the fibers containing tributyltin N,N-bis(2 - cyanoethyl)maleamate was reduced from an intial value of 59% to 54% after eighty hours exposure and that the fiber-containing di(2-ethylhexyl)tin di[alpha(5,5-diethyl-1,3-dioxa - 2 - thio-3-phosphacyclohexylthio) - N,N-bis(2-cyanoethyl)succinamate] suffered no reduction in blue light reflectance from an initial 60% after eighty hours exposure, whereas control fibers containing no stabilizer had their blue light reflectance reduced from an initial value of 58% to 29% after the same exposure.

In addition to the good light stabilizing action of the tin carboxamates of this example on the undyed terpolymer, it was noted that these stabilizers caused significantly less blushing of the fiber in boiling water than stabilizers now available commercially. Similar tests conducted with these stabilizers on copolymers of vinyl chloride and acrylonitrile in the manner described in Example 9 gave comparable results.

It is to be expected that numerous modifications will readily become apparent to those skilled in the art upon reading this description. All such modifications are intended to be included within the scope of the invention as defined in the appended claims.

We claim:

1. An organic tin carboxamate having the general formula

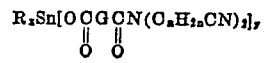

wherein R is a hydrocarbon radical containing up to about eighteen carbon atoms; G is a divalent hydrocarbon group, the dicarboxylic acid derivative of which is susceptible to intramolecular dehydration to form the corresponding cyclic anhydride; $C_nH_{2n}$ is a divalent lower alkylene group; $x$ is an integer from 2 to 3; and $y$ is an integer from 1 to 2; the sum of $x$ and $y$ being 4.

2. An organic tin carboxamate having the general formula

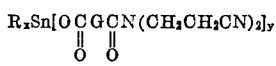

wherein R is a hydrocarbon radical selected from the group consisting of phenyl radicals and alkyl radicals containing up to about eighteen carbon atoms; G is a divalent hydrocarbon group selected from the group consisting of ethylene, propylene, vinylene and phenylene groups; $x$ is an integer from 2 to 3; $y$ is an integer from 1 to 2; and the sum of $x$ and $y$ is 4.

3. A polyalkyltin N,N-bis-cyanoalkyl carboxamate.
4. A polyphenyltin N,N-bis-cyanoalkyl carboxamate.
5. Dibutyltin di[N,N-bis(2 - cyanoethyl)succinamate].
6. Di(2-ethylhexyl)tin di[N,N-bis(2 - cyanoethyl)succinamate].
7. Dibutyltin di[N,N-bis(2 - cyanoethyl)fluorylsuccinamate].
8. Dibutyltin di[N,N-bis(2 - cyanoethyl)phthalamate].
9. Dibutyltin di[N,N - bis(2 - cyanoethyl)tetrahydrophthalamate].
10. Dilauryltin di[N,N-bis(2-cyanoethyl)maleamate].
11. Diphenyltin di[N,N-bis(2-cyanoethyl)maleamate].
12. Triphenyltin di[N,N - bis(2-cyanoethyl)maleamate].
13. Di(2 - ethylhexyl)tin di[N,N-bis(2 - cyanoethyl)maleamate].
14. Tributyltin [N,N - bis(2-cyanoethyl)maleamate].
15. Di(2 - ethylhexyl)tin di[alpha-(5,5 - diethyl-1,3-dioxa - 2-thio-2-phosphacyclohexylthio)-N,N-bis(2-cyanoethyl)succinamate].

References Cited in the file of this patent
UNITED STATES PATENTS

| | | |
|---|---|---|
| 2,307,092 | Yngve | Jan. 5, 1943 |
| 2,307,157 | Quattlebaum et al. | Jan. 5, 1943 |
| 2,727,917 | Mack et al. | Dec. 20, 1955 |
| 2,742,498 | Smith et al. | Apr. 17, 1956 |
| 2,762,821 | Walde et al. | Sept. 11, 1956 |
| 2,820,053 | Hotten | Jan. 14, 1958 |
| 2,838,554 | Gloskey | June 10, 1958 |

OTHER REFERENCES

Luijten et al.: "Investigations in the Field of Organotin Chemistry," Tin Research Institute, October 1955, pages 7, 99–100, and 112 relied on.